US009398572B2

(12) United States Patent
Zhu et al.

(10) Patent No.: US 9,398,572 B2
(45) Date of Patent: Jul. 19, 2016

(54) ENHANCED PHYSICAL DOWNLINK CONTROL CHANNEL (EPDCCH) INTER-CELL INTERFERENCE COORDINATION (ICIC)

(75) Inventors: Yuan Zhu, Beijing (CN); Xiaogang Chen, Beijing (CN); Qinghua Li, San Ramon, CA (US); Kamran Etemad, Potomac, MD (US); Seunghee Han, Anyangshi (KR)

(73) Assignee: INTEL CORPORATION, Santa Clara, CA (US)

( * ) Notice: Subject to any disclaimer, the term of this patent is extended or adjusted under 35 U.S.C. 154(b) by 851 days.

(21) Appl. No.: 13/591,673

(22) Filed: Aug. 22, 2012

(65) Prior Publication Data

US 2013/0242885 A1 Sep. 19, 2013

Related U.S. Application Data

(60) Provisional application No. 61/612,188, filed on Mar. 16, 2012.

(51) Int. Cl.
*H04W 72/04* (2009.01)
*H04W 24/02* (2009.01)
(Continued)

(52) U.S. Cl.
CPC ......... *H04W 72/0413* (2013.01); *H04L 1/1635* (2013.01); *H04L 1/189* (2013.01); *H04L 1/1825* (2013.01); *H04L 1/1854* (2013.01); *H04L 1/1864* (2013.01); *H04L 1/1877* (2013.01); *H04L 1/1887* (2013.01); *H04L 1/1896* (2013.01); *H04L 5/001* (2013.01);
(Continued)

(58) Field of Classification Search
CPC .................................................. H04W 74/085
USPC .......................................................... 370/392
See application file for complete search history.

(56) References Cited

U.S. PATENT DOCUMENTS

2010/0227569 A1* 9/2010 Bala .................. H04L 5/0007
455/73
2011/0075624 A1 3/2011 Papasakellariou et al.
(Continued)

FOREIGN PATENT DOCUMENTS

EP 2 383 928 * 2/2011
EP 2381709 A1 10/2011
(Continued)

OTHER PUBLICATIONS

Nokia Siemens Networks, 'Multiplexing of E-PDCCH for different users', 3GPP TSG RAN WG1 Meeting # 68, R1-120735, Dresden, Germany, Feb. 6-10, 2012, 4 pages.*
(Continued)

*Primary Examiner* — Ian N Moore
*Assistant Examiner* — Mewale Ambaye
(74) *Attorney, Agent, or Firm* — Thorpe North & Western LLP

(57) ABSTRACT

Technology for communicating enhanced physical downlink control channels (ePDCCHs) configured for inter-cell interference coordination (ICIC) for a plurality of cells in a physical resource block (PRB) is disclosed. One method can include a node mapping a serving cell control channel element (CCE) in an serving cell ePDCCH in a PRB and a coordination cell CCE in a coordination cell ePDCCH in the PRB. The node can transmit the map of the serving cell CCE and the coordination cell CCE to a wireless device.

19 Claims, 12 Drawing Sheets

(51) Int. Cl.
| | |
|---|---|
| H04N 21/414 | (2011.01) |
| H04N 21/6408 | (2011.01) |
| H04W 4/06 | (2009.01) |
| H04L 5/00 | (2006.01) |
| H04L 5/14 | (2006.01) |
| H04L 1/18 | (2006.01) |
| H04W 74/08 | (2009.01) |
| H04L 12/18 | (2006.01) |
| H04L 29/06 | (2006.01) |
| H04N 21/258 | (2011.01) |
| H04N 21/6405 | (2011.01) |
| H04W 24/00 | (2009.01) |
| H04W 28/02 | (2009.01) |
| H04W 72/08 | (2009.01) |
| H04W 76/04 | (2009.01) |
| H04L 1/16 | (2006.01) |
| H04W 52/02 | (2009.01) |
| H04W 52/14 | (2009.01) |
| H04W 72/12 | (2009.01) |
| H04L 1/00 | (2006.01) |

(52) U.S. Cl.
CPC ............ *H04L 5/0053* (2013.01); *H04L 5/0055* (2013.01); *H04L 5/14* (2013.01); *H04L 5/1438* (2013.01); *H04L 5/1469* (2013.01); *H04L 12/189* (2013.01); *H04L 65/601* (2013.01); *H04N 21/25841* (2013.01); *H04N 21/41407* (2013.01); *H04N 21/6405* (2013.01); *H04N 21/6408* (2013.01); *H04W 4/06* (2013.01); *H04W 24/00* (2013.01); *H04W 24/02* (2013.01); *H04W 28/0236* (2013.01); *H04W 28/0268* (2013.01); *H04W 28/0278* (2013.01); *H04W 52/02* (2013.01); *H04W 52/0206* (2013.01); *H04W 52/0209* (2013.01); *H04W 52/0235* (2013.01); *H04W 72/04* (2013.01); *H04W 72/042* (2013.01); *H04W 72/0406* (2013.01); *H04W 72/048* (2013.01); *H04W 72/0426* (2013.01); *H04W 72/082* (2013.01); *H04W 72/1205* (2013.01); *H04W 72/1284* (2013.01); *H04W 74/085* (2013.01); *H04W 76/048* (2013.01); *H04L 1/0033* (2013.01); *H04L 1/1819* (2013.01); *H04W 52/0229* (2013.01); *H04W 52/143* (2013.01); *H04W 72/0446* (2013.01); *H04W 72/1268* (2013.01); *Y02B 60/50* (2013.01)

(56) References Cited

U.S. PATENT DOCUMENTS

| | | | |
|---|---|---|---|
| 2011/0235603 A1* | 9/2011 | Cheng | ............... H04L 5/0032 370/329 |
| 2011/0274066 A1 | 11/2011 | Tee et al. | |
| 2013/0114522 A1* | 5/2013 | Frenne et al. | ............... 370/329 |

FOREIGN PATENT DOCUMENTS

| | | |
|---|---|---|
| EP | 2383928 A2 | 11/2011 |
| JP | 2010/16494 | 1/2010 |
| WO | WO 2010/053984 A2 | 5/2010 |
| WO | WO 2011/025202 A2 | 3/2011 |
| WO | WO 2011/047348 A1 | 4/2011 |

OTHER PUBLICATIONS

Nokia Siemens Networks, 'Multiplexing of E-PDCCH for different users', 3GPP TSG RAN WG1 Meeting # 68. Germany, Feb. 6-10, 2012, 4 pages.*
Intel Corporation, 'UE-RS Multiplexing for Multiple CCEs', 3GPP TSG RAN WG1 Meeting # 68, R1-120816, Dresden, Germany, Feb. 6-10, 2012, 5 pages.
International Search Report and Written Opinion received for PCT Patent Application No. PCT/US2013/031633, mailed on Jun. 27, 2013, 15 pages.
3GPP TS 36.213, "Evolved Universal Terrestrial Radio Access (E-UTRA)", Physical Layer Procedures, Mar. 2012, pp. 126, V 10.5.0, Release 10, Valbonne, France.
3GPP TS 36.300, "Evolved Universal Terrestrial Radio Access (E-UTRA) and Evolved Universal Terrestrial Radio Access Network (E-UTRAN)", Overall Description Stage 2, Mar. 2012, pp. 194, V 11.1.0, Release 11, Valbonne, France.
3GPP TS 36.423, "Evolved Universal Terrestrial Radio Access (E-UTRA)", X2 Application Protocol (X2AP), Mar. 2012, pp. 134, V 11.0.0, Release 11, Valbonne, France.
CMCC, "Discussion on Multiplexing of ePDCCH and PDSCH", 3GPP TSG-RAN WG1 R1-120638, Feb. 2012, pp. 3, Meeting 68, Agenda 7.6.2, Dresden, Germany.
Fujitsu, "Search Space Design for Downlink Control Channel", 3GPP TSG RAN WG1 R1-120752, Feb. 2012, pp. 6, Meeting 68, Agenda 7.6.3, Dresden, Germany.
Intel Corporation, "Search Space Design of ePDCCH", 3GPP TSG RAN WG1 R1-113949, Nov. 2011, pp. 4, Meeting 67, Agenda 7.7.3, San Francisco, CA, USA.
Intel Corporation, "Time Domain Lightly Loaded PDCCH Region", 3GPP TSG RAN WG1 R1-104375, Aug. 2010, pp. 4, Meeting 62, Agenda 6.8.1, Madrid, Spain.
Office Action for Japanese application 2015-500631 dated Sep. 1, 2015, 13 pages including English translation.
Office Action for Korean application 10-2014-7027275 dated Oct. 8, 2015, 8 pages including English translation.
Search Report for European application 13761556.3 dated Oct. 19, 2015, 11 pages.
Alcatel-Lucent et al, "Further Details of CoMP Scenarios for Evaluation, Especially Scenario 4", 3GPP TSG RAN WG1 R1-110802, Feb. 2011, Meeting 64, Agenda 6.3.1.2, 8 pages, Taipei, Taiwan.
Ericsson et al, "On Multiplexing of PDSCH with Enhanced Control Channels", 3GPP TSG-RAN WG1 R1-120077, Feb. 2012, Meeting 68, Agenda 7.6.2, 3 pages, Dresden, Germany.
Intel Corporation, Analysis of ePDCCH ICIC, 3GPP TSG-RAN WG1 R1-121535, Mar. 2012, Meeting 68bis, Agenda 7.6.3, pp. 4, Jeju, Korea.

* cited by examiner

ENHANCED PHYSICAL DOWNLINK CONTROL CHANNEL (EPDCCH) INTER-CELL INTERFERENCE COORDINATION (ICIC)

RELATED APPLICATIONS

This application claims the benefit of and hereby incorporates by reference U.S. Provisional Patent Application Ser. No. 61/612,188, filed Mar. 16, 2012.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (or eNodeB) to the wireless device (or UE), and the uplink (UL) transmission can be a communication from the wireless device to the node.

In LTE, data can be transmitted from the eNode B to the UE via a physical downlink shared channel (PDSCH). A physical downlink control channel (PDCCH) can be used to transfer downlink control information (DCI) that informs the UE about resource allocations or scheduling related to downlink resource assignments on the PDSCH, uplink resource grants, and uplink power control commands. The PDCCH can be transmitted prior the PDSCH in each subframe transmitted from the eNode B to the UE.

The PDCCH signal can be designed to be demodulated at the UE based on a cell specific reference signal (CRS). However, the use of a CRS does not take into account the increased complexities of advanced LTE systems. For instance, in heterogeneous networks, multiple nodes can simultaneously transmit within a single cell. The use of the cell specific reference signal can limit advanced techniques to increase cell capacity.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
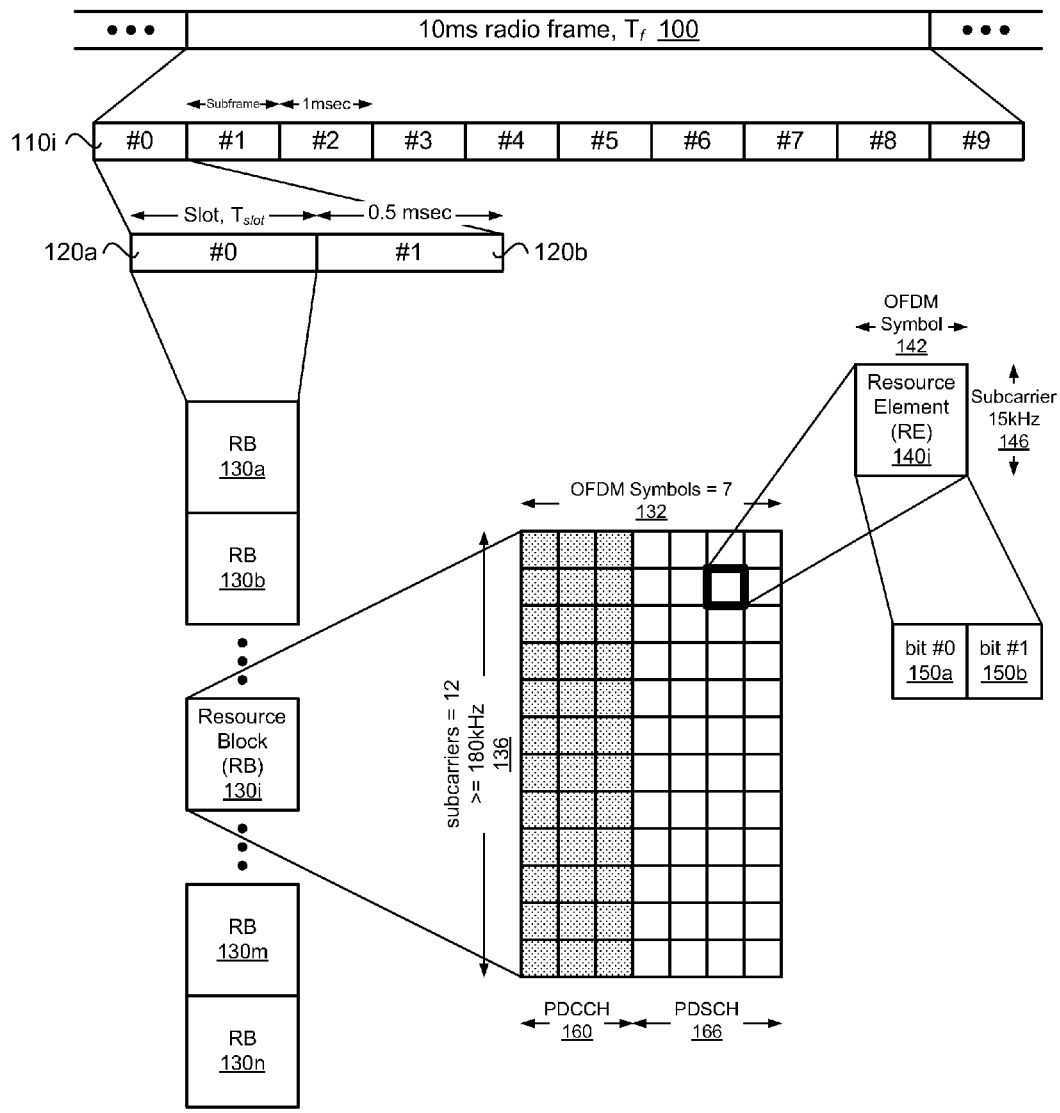
FIG. 1 illustrates a block diagram of radio frame resources (e.g., a resource grid) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The communication of data on the PDSCH can be controlled via a control channel, referred to as a physical downlink control channel (PDCCH). The PDCCH can be used for downlink (DL) and uplink (UL) resource assignments, transmit power commands, and paging indicators. The PDSCH scheduling grant can be designated to a particular wireless device (e.g., UE) for dedicated PDSCH resource allocation to carry UE-specific traffic, or it can be designated to all wireless devices in the cell for common PDSCH resource allocation to carry broadcast control information such as system information or paging.

In one example, the PDCCH and PDSCH can represent elements of a radio frame structure transmitted on the physical (PHY) layer in a downlink transmission between a node (e.g., eNodeB) and the wireless device (e.g., UE) using a generic long term evolution (LTE) frame structure, as illustrated in FIG. 1.

FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110*i* that are each 1 ms long. Each subframe can be further subdivided into two slots 120*a* and 120*b*, each with a duration, $T_{slot}$, of 0.5 ms. The first slot (#0) 120*a* can include a legacy physical downlink control channel (PDCCH) 160 and/or a physical downlink shared channel (PDSCH) 166, and the second slot (#1) 120*b* can include data transmitted using the PDSCH.

Each slot for a component carrier (CC) used by the node and the wireless device can include multiple resource blocks (RBs) 130*a*, 130*b*, 130*i*, 130*m*, and 130*n* based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

Each RB (physical RB or PRB) 130*i* can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140*i* using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 2:
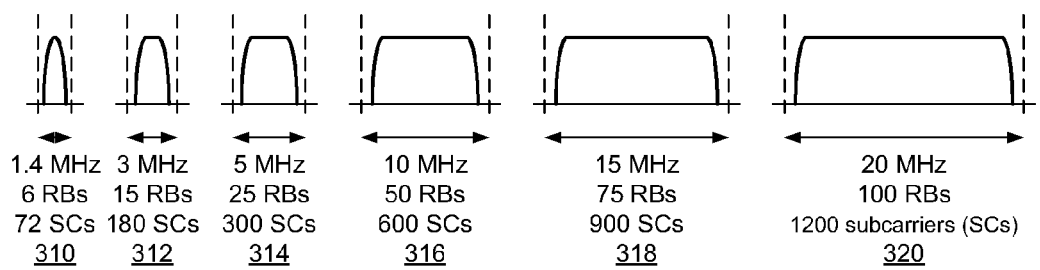
FIG. 2 illustrates a block diagram of various component carrier (CC) bandwidths in accordance with an example.

Each wireless device may use at least one signal bandwidth, carrier bandwidth, or component carrier (CC), as illustrated in FIG. 2. For example, the LTE CC bandwidths can include: 1.4 MHz 310, 3 MHz 312, 5 MHz 314, 10 MHz 316, 15 MHz 318, and 20 MHz 320. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

The data carried on the PDCCH can be referred to as downlink control information (DCI). Multiple wireless devices can be scheduled in one subframe of a radio frame. Therefore, multiple DCI messages can be sent using multiple PDCCHs. The DCI information in a PDCCH can be transmitted using one or more control channel elements (CCE). A CCE can be comprised of a group of resource element groups (REGs). A legacy CCE can include up to nine REGs. Each REG can be comprised of four resource elements (REs). Each resource element can include two bits of information when quadrature modulation is used. Therefore, a legacy CCE can include up to 72 bits of information. When more than 72 bits of information are needed to convey the DCI message, multiple CCEs can be employed. The use of multiple CCEs can be referred to as an aggregation level. In one example, the aggregation levels can be defined as 1, 2, 4 or 8 consecutive CCEs allocated to one PDCCH.

The legacy PDCCH can create limitations to advances made in other areas of wireless communication. For example, mapping of CCEs to subframes in OFDM symbols is typically spread over the control region to provide spatial diversity. However, no beam forming diversity may be possible with the current mapping procedures. In addition, interference coordination with neighboring cells may not be possible using current mapping procedures since orthogonality cannot be guaranteed among neighboring cells, thereby resulting in potential subcarrier collisions occurring.

Moreover, the capacity of the legacy PDCCH may not be sufficient for advanced control signaling. For instance, networks may be configured as heterogeneous networks (HetNets) can include a number of different kinds of nodes in a single macro cell serving area. More wireless devices can be served simultaneously by macro and pico cells in the HetNet. The PDCCH can be designed to demodulate based on cell-specific reference signals (CRS), which can make fully exploring cell splitting gain difficult. The legacy PDCCH may not be adequate to convey the information needed to allow a wireless device to take advantage of the multiple transmission nodes in the HetNet to increase bandwidth and decrease battery usage at the wireless device.

In addition, the use of multi-user multiple-input multiple-output (MU-MIMO), machine to machine communication (M2M), PDSCH transmission in a multicast\broadcast single-frequency network, and cross carrier scheduling in carrier aggregation can require increased capacity for the PDCCH. The use of UE specific reference signals (UERS) in PDCCH demodulation at the wireless device can allow the use of multiple nodes in the HetNet. Rather than relying on a single common reference symbol (e.g., CRS) for an entire cell, each reference symbol can be UE specific (e.g., UERS).

To overcome the limitations of the legacy PDCCH, an enhanced PDCCH (ePDCCH) can use the REs in an entire PRB or PRB pair (where a PRB pair is two contiguous PRBs using the same subcarrier's subframe), instead of just the first one to three columns of OFDM symbols in a first slot PRB in a subframe as in the legacy PDCCH. Accordingly, the ePDCCH can be configured with increased capacity to allow advances in the design of cellular networks and to minimize currently known challenges.

The ePDCCH can be used to support frequency domain inter-cell interference coordination (ICIC). In an example, ICIC can be used to decrease interference between neighboring cells or nodes (e.g., coordination nodes or cooperation nodes) by lowering the power of a part of the subchannels in the frequency domain which then can be received close to the node. The subchannels do not interfere with the same subchannels used in neighboring cells and thus, data can be sent to mobile devices with less interference on the subchannels close to the cell.

Another ICIC technique is enhanced ICIC (eICIC) used in the time domain for heterogeneous networks (HetNets), where a high power macro cell can be complemented with low power nodes such as pico cells (hotspots in shopping centers or at airports) or femto cells (hotspots in small areas such as homes or businesses). The low power nodes can exist inside a macro cell coverage area. The macro cell can transmit long range high power signals, and the low power nodes can transmit low power signals over short distances. In an example to mitigate interference between the macro cell and the several low power nodes located within the macro cell coverage area, eICIC can coordinate the blanking of subframes in the time domain in the macro cell. As used herein, a cell can refer to the node (e.g., eNB) configured to communicate with wireless devices within a geographic region that is referred to as a cell coverage area.

Unlike the legacy PDCCH, the ePDCCH can be mapped to the same REs or region in a PRB as the PDSCH, but in different PRBs. In an example, the PDSCH and the ePDCCH may not be multiplexed within a same PRB (or a same PRB pair). Thus if one PRB (or one PRB pair) contains an ePDCCH, the unused REs in the PRB (or PRB pair) may be blanked, since the REs may not be used for the PDSCH.

Figure 3:
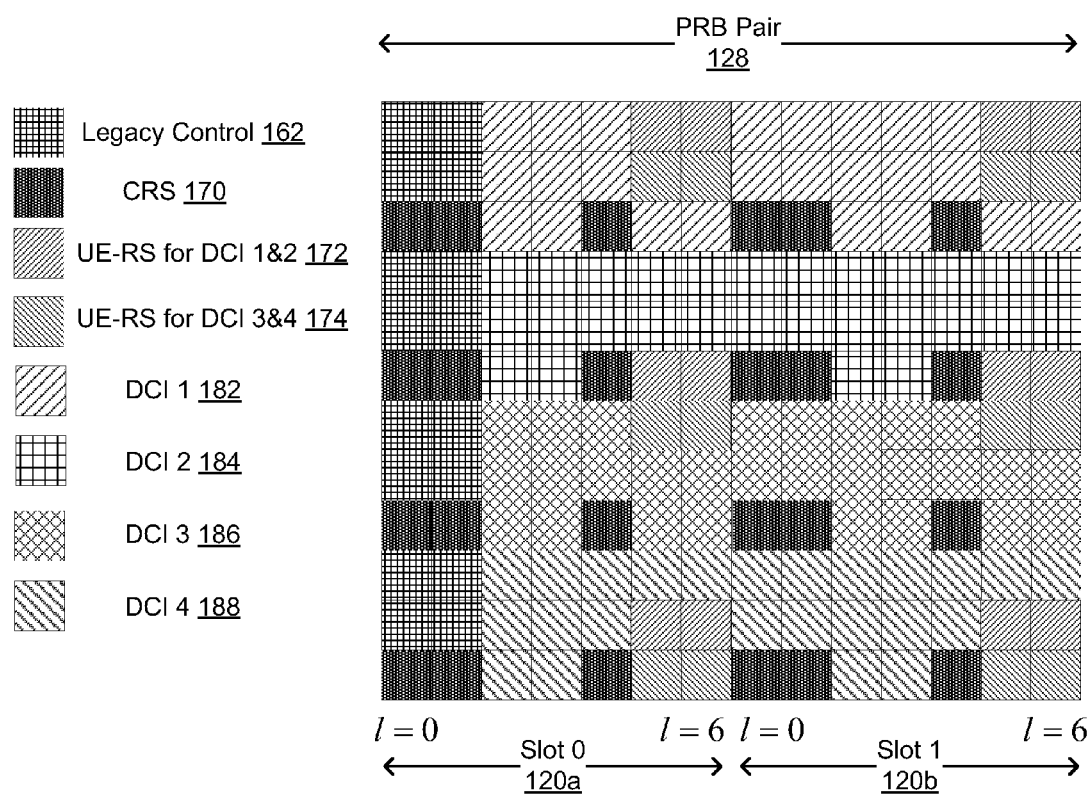
FIG. 3 illustrates a block diagram of multiplexing four localized aggregation level one control channel elements (CCE) associated with downlink control information (DCI) for different wireless devices into one physical resource block (PRB) pair in accordance with an example.

FIG. 3 illustrates 4 DCIs 182, 184, 186, and 188 of an ePDCCH in a PRB pair 128. Each DCI of the ePDCCH can be transmitted by at least one CCE, and each CCE can include a plurality of REGs, and each REG can include a plurality of REs. FIG. 3 illustrates a multiplexing pattern of an ePDCCH when multiple aggregation level one (AGL1) localized CCEs are multiplexed in one PRB pair. An aggregation level one CCE (e.g., a single CCE) can include a DCI, so four CCEs can include four separate DCIs. In another example (not shown), an aggregation level two CCE (e.g., two CCEs) can include one DCI. The PRB pair can also include legacy control 162 (e.g., legacy PDCCH) and reference signals, such as cell-specific reference signals (CRS) 170 and UE specific reference signals (UERS) 172 and 174, used for demodulation and channel estimation. In an example, DCI 1 and DCI 2 can use UERS 172, which can be different from the UERS 174 used by DCI 3 and DCI 4.

Figure 4:
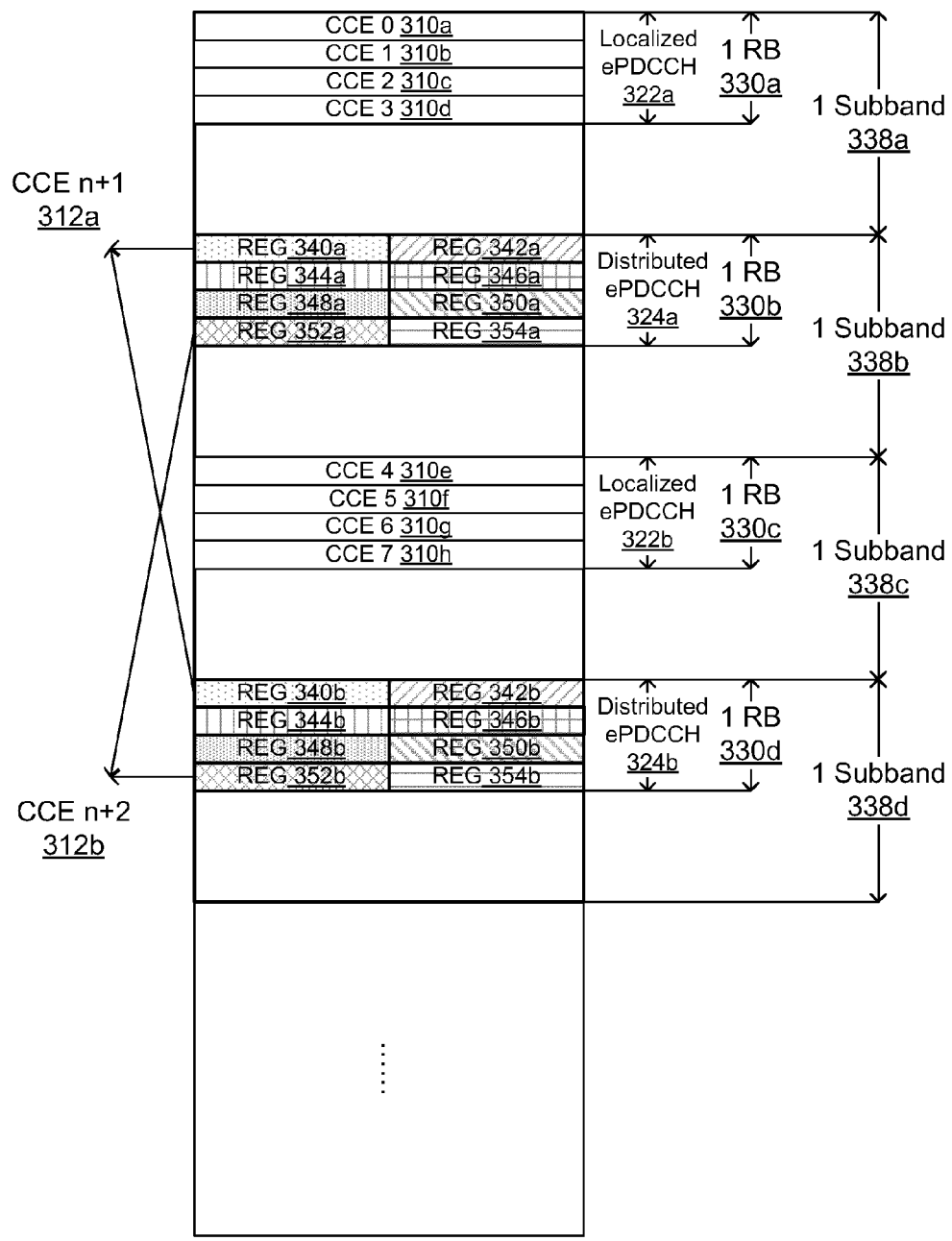
FIG. 4 illustrates a block diagram of control channel elements (CCE) and resource element groups (REG) mapped to a subframe using localized enhanced physical downlink control channels (ePDCCH) and distributed ePDCCH in accordance with an example.
Figure 5:
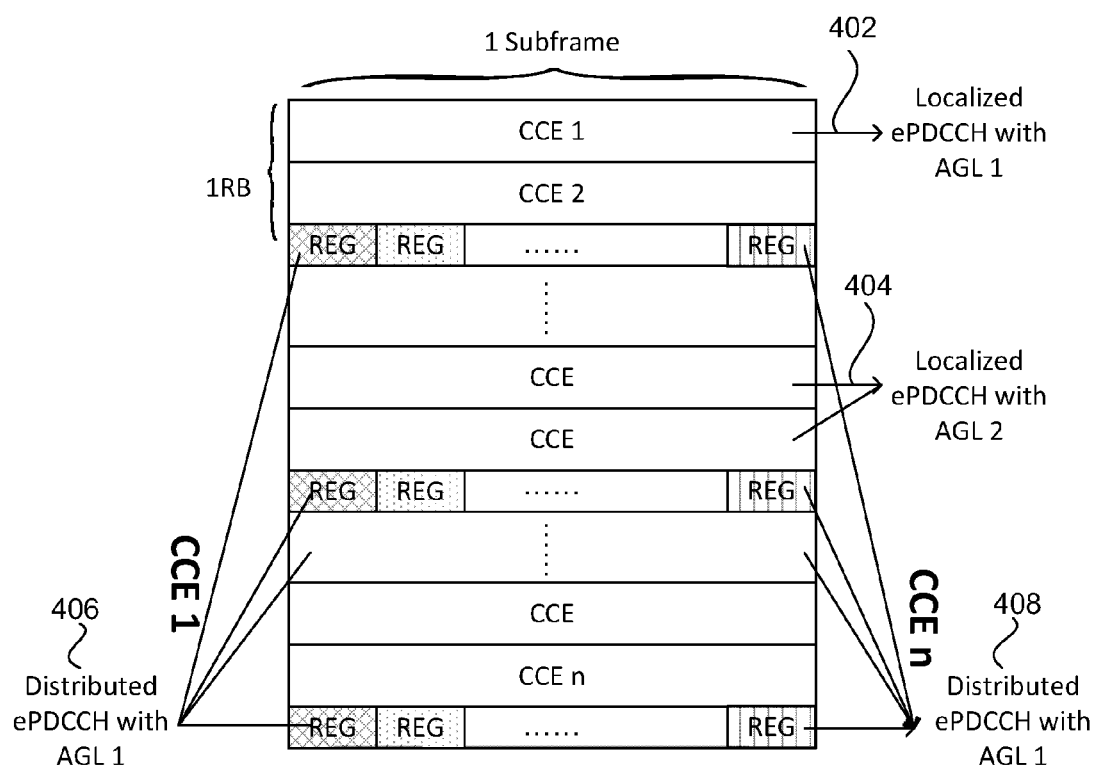
FIG. 5 illustrates a block diagram of an enhanced physical downlink control channel (ePDCCH) mapped to a subframe using localized ePDCCH and distributed ePDCCH in accordance with an example.

The PRB or PRB pair can be used to support both localized ePDCCH and distributed ePDCCH transmissions. FIGS. 4 and 5 illustrate localized ePDCCH and distributed ePDCCH in a slot or a subframe. In a localized ePDCCH 332*a-b*, the entire CCE 310*a-h* may be within a PRB 330*a* and 330*c* (or PRB pair) within a subband 338*a* and 338*c*, as illustrated in FIG. 4. In an example, the REGs (or REs) of the localized CCE can be contiguous to each other, which may be followed by a subsequent CCE. In a distributed ePDCCH 324*a-b*, the REGs 340*a-b*, 342*a-b*, 344*a-b*, 346*a-b*, 348*a-b*, 350*a-b*, 352*a-b*, and 354*a-b* of the CCE 312*a-b* can be distributed over multiple PRBs 330*b* and 330*d* (or PRB pairs). The REG(s) 340*a* in one PRB 330*b* and the REG(s) 340*b* in another PRB 330*d* can form the CCE 312*a* for the DCI or the distributed ePDCCH. In distributed ePDCCH, the REGs for a CCE can be distributed over two or more PRBs (or two or more PRB pairs). In an example, the REGs of the CCEs used in the distributed ePDCCH can be distributed over different subbands 338*b* and 338*d*.

FIG. 5 provides another example of a localized ePDCCH and a distributed ePDCCH mapped into CCEs, REGs, and REs within a subframe. In the example of FIG. 5, each resource block pair can comprise two resource blocks (RB or PRB), each having the same subcarriers, located in a first and second slot in the subframe of a radio frame, as shown in FIG. 1. Each RB can include at least one CCE. The CCE may be in a defined location within the RB. However, the CCE may include REGs that are located throughout the resource block. Each REG may include four REs. However, based on system requirements, a REG may include more or less REs. In an example, the REs located in a REG can be contiguous in at least one of frequency and time. In another example, the REs located in a REG may be separated in time and/or frequency. The number of REGs in a CCE may be a fixed number, such as nine. Alternatively, the number of REGs may vary based on DCI data load requirements (i.e., the amount of DCI data), or other competing requirements in the RB, such as physical control format indicator channel (PCFICH) requirements, physical hybrid-ARQ indicator channel (PHICH) requirements, and resource symbol requirements for data allocated within each resource block. The CCE may be mapped across a slot boundary in the physical resource block pair.

A localized ePDCCH 402 having aggregation level (AGL) one can be mapped to a single CCE, which can be mapped to a single RB, as shown in FIG. 5. Similarly, a localized ePDCCH 404 with an aggregation level of two may be mapped to two contiguous CCEs in a RB. For a distributed ePDCCH 406 and 408, the CCE(s) (e.g. CCE 1 and CCE N) can mapped to a plurality of REGs in different RBs in different frequency carriers and subcarriers. For example, the REGs for the CCE N can be distributed in frequency. The frequency separation of the REGs can provide a frequency diversity gain. In an example, each REG in a CCE may be mapped to a separate RB, although more than one REG may be mapped to a same RB as another REG. A greater frequency diversity gain that can occur with widely distributed the REGs. The REGs in CCE 1 and CCE N may have the same distribution (shown) or different distribution (not shown) amongst RBs in a subframe. While the REGs illustrated in the distributed ePDCCH 406 and 408 are each shown to be in the same time position within a RB, for each respective CCE, a same time position within a RB for the distributed ePDCCH is not required. The distributed REGs in CCE 1 and CCE N may be in a different temporal location within a resource block. Each CCE in a subframe may have a same number of REGs or a different number of REGs. The distributed ePDCCH can have an aggregation level of one. The aggregation level of one implies that the DCI information can be mapped to a single CCE.

The distribution of the REGs in a CCE over frequency to different resource blocks in a subframe can provide an increase in frequency diversity gain. To achieve good frequency diversity, a frequency diversity order of 3 or 4 can be used. FIG. 5 illustrates a distributed ePDCCH 406 and 408 transmission a high frequency diversity order and low aggregation level.

Frequency diversity for a cell can be achieved by applying wideband scheduling with wideband channel state information (CSI) feedback. For example, an ePDCCH configuration can be configured with four PRB pairs in each cell to achieve a frequency diversity order four using distributed ePDCCH transmission.

Figure 6:
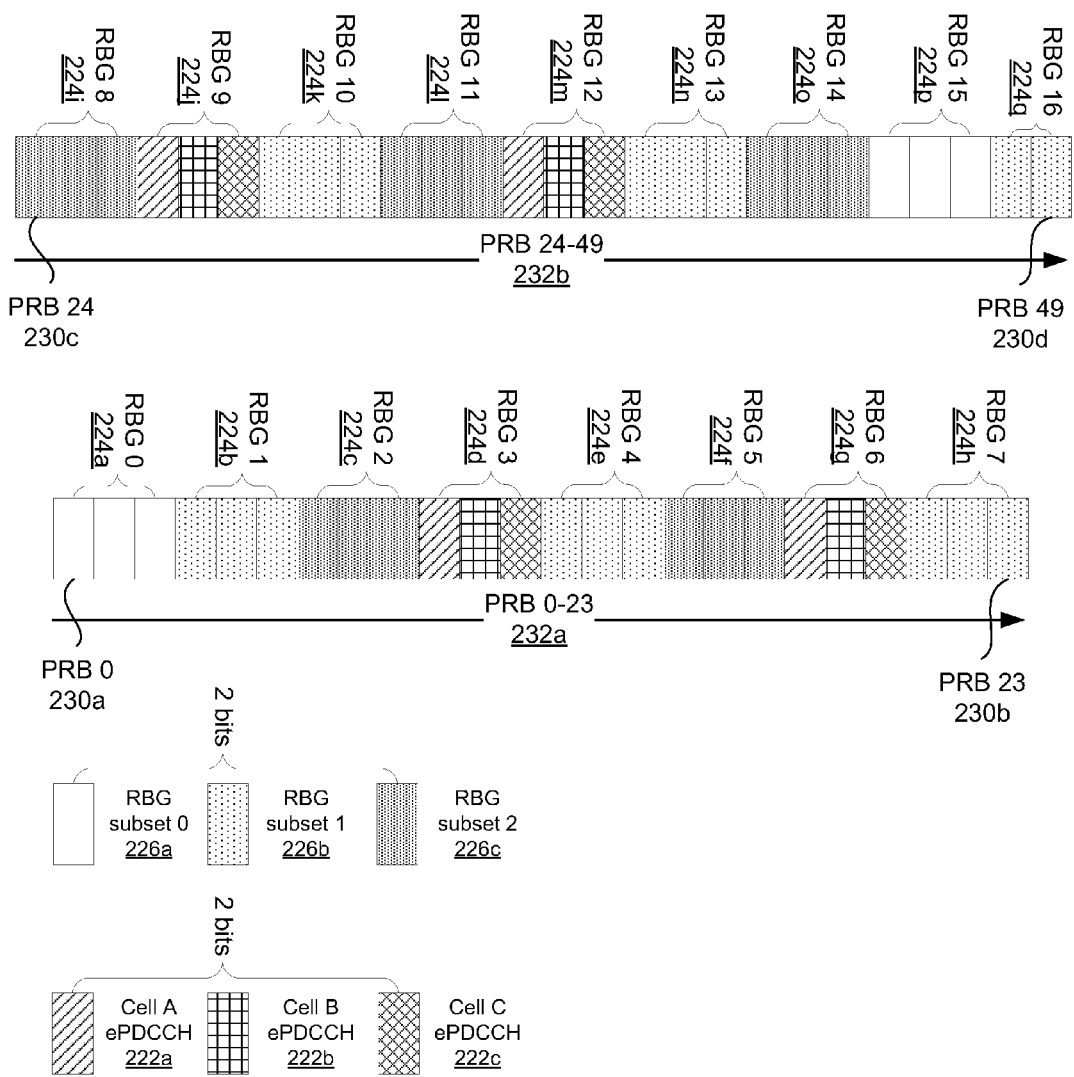
FIG. 6 illustrates a block diagram of frequency domain inter-cell interference coordination (ICIC) for enhanced physical downlink control channel (ePDCCH) in the granularity of one physical resource block (PRB) in accordance with an example.

Since the legacy frequency domain ICIC schemes may only support PRB pair level ICIC, if a frequency domain ICIC scheme for ePDCCH ICIC is used, more PRB pairs may be muted in the neighboring cells (e.g., coordination cells) for PDSCH transmission. FIG. 6 gives an example of ePDCCH configurations with three cells (e.g., cells A, B, and C) where each cell is configured with four PRBs for ePDCCH. To achieve a frequency diversity order of four and a frequency reuse factor of three in frequency domain ICIC, each cell allocates 12 PRBs in total that are used exclusively for ePDCCH and the cell's ICIC. FIG. 6 illustrates PRB bundling or resource block grouping for a system bandwidth of 10 MHz (e.g., 50 PRBs 232a-b; see 316 of FIG. 2) with 12 PRBs (or 4 resource block groups (RBG) 224d, g, j, and m) allocated for ePDCCH and the cells' ICIC and the remaining 38 PRBs (or 13 RBG 224a-c, e-f, h-i, k-l, and n-q) allocated to PDSCH. Each RBG can be allocated to a subset 0, 1, or 2 (226a-c). In an example, each subset can represent a cell (e.g., cell A, B, or C).

In FIG. 6, the 50 PRBs can be represented by PRB 0-23 232a (for PRBs from PRB 0 230a to PRB 23 230b) and PRB 24-49 232b (for PRBs from PRB 24 230c to PRB 49 230d). Since ePDCCH can be allocated based on a PRB basis (or PRB pair basis, each cell can include a dedicated ePDCCH 222a-c, and four dedicated ePDCCH for a frequency diversity order of four. The unused PRBs used for coordination cell ePDCCH (cell B and C ePDCCH for cell A transmissions) can be blanked, which may not be an efficient use of resources. In the example with a frequency diversity order of four and a frequency reuse factor of three in frequency domain ICIC, 8 PRBs of the 50 PRBs for a 10 MHz system bandwidth may be blanked, which cannot be used for PDSCH transmissions.

To achieve both high frequency diversity order and meaningful frequency reuse factor for frequency domain ICIC at the same time, an ePDCCH with a finer granularity than one PRB (or one PRB pair) can be used for greater resource utilization, which can be used for frequency domain ICIC. For example the frequency domain granularity for ePDCCH ICIC can be as fine as one localized CCE.

Figure 7:
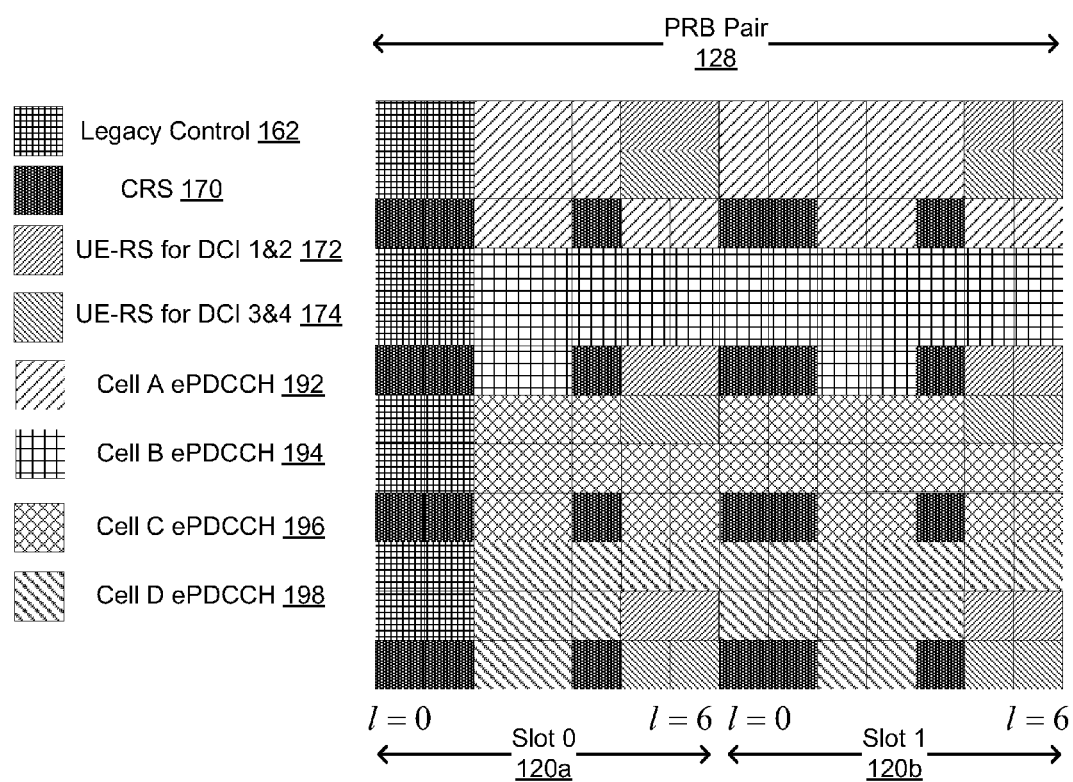
FIG. 7 illustrates a block diagram of multiplexing four localized aggregation level one control channel elements (CCE) in enhanced physical downlink control channels (ePDCCH) associated with downlink control information (DCI) for different cells into one physical resource block (PRB) pair in accordance with an example.

FIG. 7 illustrates an example of four cells configured with the same four PRB pairs to transmit ePDCCH for a frequency diversity order of four. Each CCE can be a localized CCE where the REGs are contiguous in time and/or frequency within a PRB (or PRB pair). In an example, each CCE (associated with a DCI) can have an aggregation level of one and can be configured for a separate ePDCCH 192, 194, 196, and 198 for a separate cell.

Figure 8:
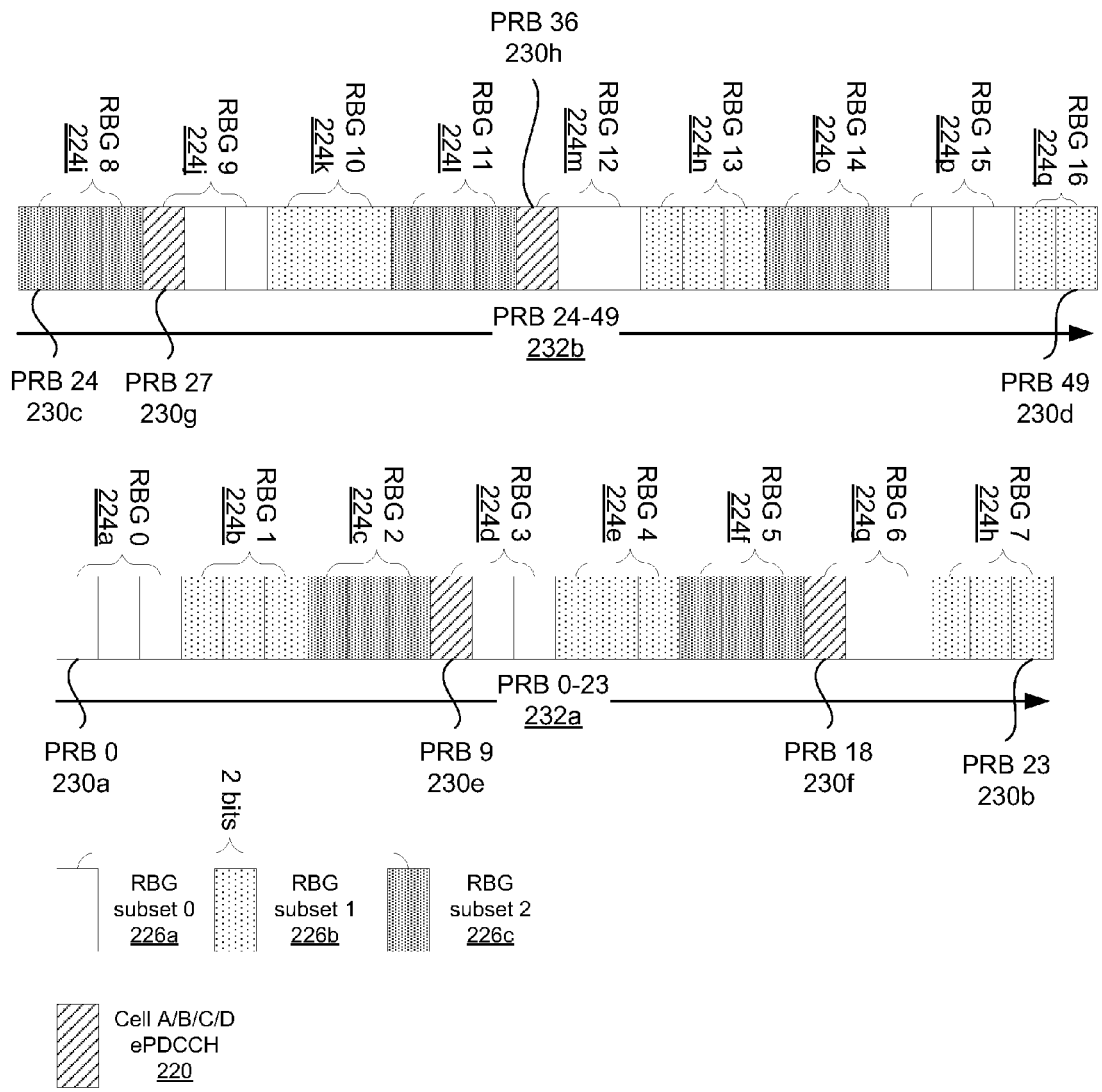
FIG. 8 illustrates a block diagram of frequency domain inter-cell interference coordination (ICIC) for enhanced physical downlink control channel (ePDCCH) in the granularity of one localized control channel elements (CCE) in accordance with an example.

FIG. 8 illustrates four PRB pairs 230e-h used to transmit ePDCCH for a frequency diversity order of four. Since one PRB pair can contain four localized CCEs, each cell can transmit a distributed ePDCCH 220 in one localized CCE in the four PRB pairs used for a frequency diversity order of four. Thus, four PRB pairs with localized CCEs can be used to achieve a frequency reuse factor four and frequency diversity order four distributed transmissions, which can eliminate 12 blanked PRBs for ePDCCH with a granularity of one PRB (or one PRB pair), which non-blanked PRBs can be used for PDSCH transmissions.

In order to enable intra-PRB (or intra-PRB pair) ICIC for ePDCCH, the localized CCE to RE mapping pattern may be cell common. Thus no cell-specific random mapping may be defined for the localized CCE. Intra-PRB (or intra-PRB pair) ICIC for ePDCCH can refer to a plurality of localized CCE in one PRB (or PRB pair) being used for different cells.

Distributed CCEs (not shown) can also be used where the REGs (or REs) of the CCEs are distributed over multiple PRBs (or PRB pairs). When mapping one distributed CCE to REs from multiple PRBs (or PRB pairs), REs belonging to the same localized CCE can be mapped to each PRB (or PRB pair). For example in FIGS. 7 and 8, each PRB pair contains four localized CCE 192, 194, 196, and 198 (FIG. 7) and each cell is configured with four PRB pairs 230e-h (FIG. 8) for ePDCCH. Mapping a distributed CCE to a same localized CCE in each of the PRB pairs (in the four PRB pairs) allows the distributed CCE to achieve the same CCE granularity ICIC gain as a localized CCE.

To support frequency domain ICIC with a finer granularity than one PRB pair, a relative narrowband transmitter (Tx) power (RNTP) report in X2 application protocol can be extended. For example, a relative narrowband transmitter power (RNTP) per enhanced CCE (E-CCE) in ePDCCH information element (IE) can be added to the RNTP report to support CCE granularity ICIC for ePDCCH. The E-CCE can include a localized CCE for ePDCCH. The RNTP per E-CCE in ePDCCH IE can include an IE/group name (RNTP per E-CCE in ePDCCH), a presence, a range, an IE type and reference, a semantics description, a criticality, and an assigned criticality. The presence for the RNTP per E-CCE in ePDCCH IE can include a mandatory (M) presence. The RNTP per E-CCE in ePDCCH IE can include an bit string (1 . . . 4, . . . ) IE type, where (semantics description) each position in the bitmap represents a E-CCE index $n_{E-CCE}$ value, for which a bit value represents RNTP $(n_{E-CCE})$, where an index is associated with a set of E-CCE, numbered from 0 to $N_{E-CCE,k}-1$, $N_{E-CCE,k}$ is a total number of E-CCE for a subframe k, and RNTP ( ) is a function of the E-CCE index $n_{E-CCE}$. A value 0 can indicate "Tx not exceeding RNTP threshold", and a value 1 can indicate "no promise on the Tx power is given".

In an example, if the RNTP per E-CCE in ePDCCH IE only contains 4 bits, then the eNB can apply the same power strategy for the same E-CCE for all ePDCCH in the PRB pair. More flexibility can be allowed if the RNTP per E-CCE in ePDCCH IE contains more than 4 bits. For example, a total of 4*N_ePDCCH_PRBs bits may be used, if the eNB is allowed to apply a different power control strategy for each individual E-CCE in each PRB pair, where N_ePDCCH_PRBs represents a total number of PRB (or PRB pairs) used for ePDCCH.

In one example embodiment, a node (e.g., eNB) can receive a relative narrowband transmitter power (RNTP) indication $RNTP(n_{SRB})$ defined as $$RNTP(n_{SRB}) = \begin{cases} 0 & \text{if } \frac{E_A(n_{SRB})}{E_{max\_norm}^{(p)}} \leq RNTP_{threshold} \\ 1 & \text{if no promise about the upper limit of } \frac{E_A(n_{SRB})}{E_{max\_norm}^{(p)}} \text{ is made} \end{cases}$$

where $E_A(n_{SRB})$ is a maximum intended energy per resource element (EPRE) of user equipment-specific (UE-specific) physical downlink shared channel (PDSCH) resource elements (REs) in orthogonal frequency-division multiplexed (OFDM) symbols not containing reference signal (RS) in a sub-PRB on antenna port p in a considered future time interval, $n_{SRB}$ is a sub-physical resource block number $n_{SRB}=$ $0, \ldots, N_{RB}^{DL} \cdot N_{SRB} - 1$, $RNTP_{threshold}$ takes on one of the following values $RNTP_{threshold} \in \{-\infty, -11, -10, -9, -8, -7, -6, -5, -4, -3, -2, -1, 0, +1, +2, +3\}$ in decibel [dB], and $$E_{max\_nom}^{(p)} = \frac{P_{max}^{(p)} \cdot \frac{1}{\Delta f}}{N_{RB}^{DL} \cdot N_{SC}^{RB}}$$

where $P_{max}^{(p)}$ is a node maximum output power (e.g., a base station maximum output power), and $\Delta f$ is a subcarrier spacing, $N_{RB}^{DL}$ is a downlink bandwidth configuration expressed in multiples of $N_{SC}^{RB}$, $N_{SC}^{RB}$ is a resource block size in the frequency domain expressed as a number of subcarriers, and is a $N_{SRB}$ is the number of sub-physical resource blocks (SRB) in the PRB, where $N_{SRB} \in \{1,2,3,4\}$. The RNTP indication can be used to apply a power strategy for the E-CCE for the ePDCCH in the PRB (or PRB pair).

An E-CCE RNTP (e.g., RNTP per E-CCE in ePDCCH IE) and/or ePDCCH PRB allocations and configurations can be included in X2 signaling. Examples of ePDCCH configuration information can include an ePDCCH PRB pair allocation IE, a number (#) of E-CCE in one PRB pair IE, and an E-CCE type IE. The ePDCCH PRB pair allocation IE, the # of E-CCE in one PRB pair IE, and the E-CCE type IE can include an IE/group name, a presence, a range, an IE type and reference, a semantics description, a criticality, and an assigned criticality. The presence for the ePDCCH PRB pair allocation IE, the # of E-CCE in one PRB pair IE, and the E-CCE type IE can include a mandatory (M) presence.

In one embodiment, the ePDCCH PRB pair allocation IE can include a bit string $(1 \ldots N_{RB}, \ldots)$ IE type, where in a semantics description each position in the bitmap represents whether one PRB pair is allocated as an ePDCCH and $N_{RB}$ represents the number of downlink PRBs in a system bandwidth. The # of E-CCE in one PRB pair IE can include an enumerated (3, 4) IE type, where in a semantics description the enumerated type represents a number of localized E-CCE in one PRB pair. The E-CCE type IE can include an bit string $(1 \ldots N_{RB}*4, \ldots)$ IE type, where in a semantics description each position in the bitmap represents whether an E-CCE is localized or not localized and $N_{RB}$ represents the number of downlink PRBs in a system bandwidth.

The RNTP per E-CCE in ePDCCH IE, the ePDCCH PRB pair allocation IE, the # of E-CCE in one PRB pair IE, and the E-CCE type IE can be included in a UE procedure for determining the PDCCH assignment. Names, labels, and descriptions of the described IEs may vary for the E-CCE functionality and the functionality of the CCE with granularity of a localized CCE allocated in an ePDCCH, as long as the functionality is similar. The IEs described can be transmitted between coordination nodes (e.g., the serving node and other coordination nodes). The information from the described IEs can be transmitted or forwarded from a serving node (e.g., eNB) to the serving wireless devices (e.g., UEs) served by the serving node using radio resource control (RRC) signaling.

The wireless device (e.g., UE) can use the ePDCCH PRB allocations and ePDCCH configuration information in an advanced receiver. An advanced receiver can include a minimum mean square error with interference rejection combining (MMSE-IRC) receiver to measure interference on the UERS and use an averaging of the interference for each individual data RE. For example, typically when an ePDCCH is transmitted in one cell, a neighboring cell (e.g., coordination cell) can be transmitting PDSCH in the same PRB pair. When doing interference averaging for the PDSCH, the wireless device may not use the interference averaging of the UERS REs because the interference covariance matrix observed in each UERS REs may overlap with a different E-CCE.

If the wireless device receives ePDCCH configuration information, such as a map of the CCE in the ePDCCH for ICIC, that the neighboring cell is transmitting ePDCCH in a PRB pair and knows the ePDCCH configurations for the neighboring cell, the wireless device can average the interference E-CCE by E-CCE (i.e., per E-CCE) in an advanced receiver.

The granularity of a localized CCE allocated an ePDCCH can provide greater resource utilization than a PRB (or PRB pair) for an ePDCCH in some applications, such as frequency domain ICIC. In addition, the granularity of a localized CCE allocated an ePDCCH can also provide better interference averaging for ICIC.

Figure 9:
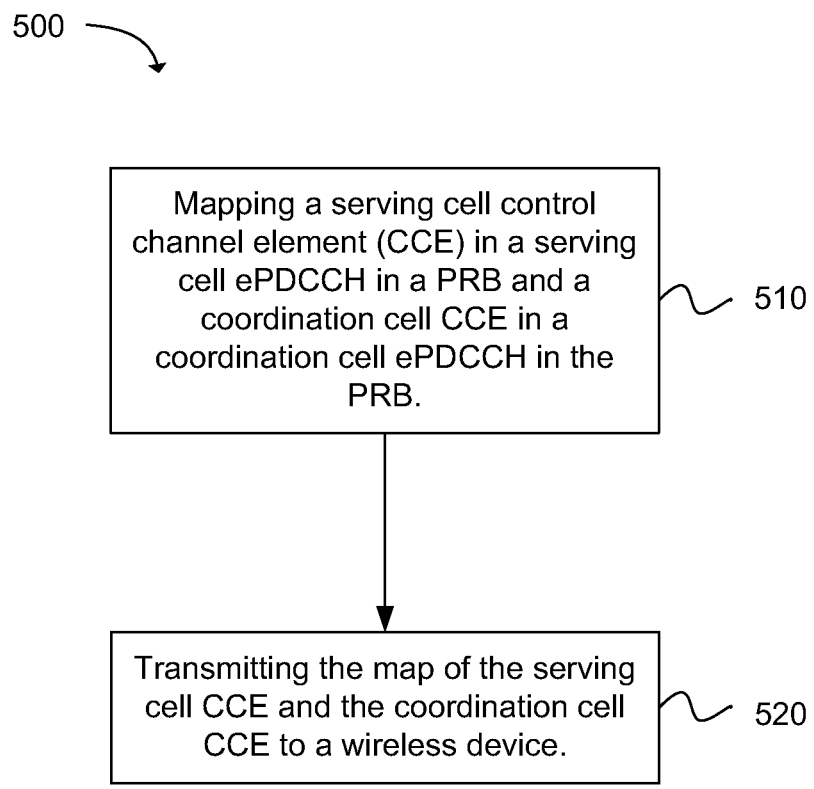
FIG. 9 depicts a flow chart of a method for communicating enhanced physical downlink control channels (ePDCCHs) configured for inter-cell interference coordination (ICIC) for a plurality of cells in a physical resource block (PRB) from a node in accordance with an example.

Another example provides a method 500 for communicating enhanced physical downlink control channels (ePDCCHs) configured for inter-cell interference coordination (ICIC) for a plurality of cells in a physical resource block (PRB) from a node, as shown in the flow chart in FIG. 9. The method may be executed as instructions on a machine, where the instructions are included on at least one computer readable medium. The method includes the operation of mapping a serving cell control channel element (CCE) in a serving cell ePDCCH in a PRB and a coordination cell CCE in a coordination cell ePDCCH in the PRB, as in block 510. The operation of transmitting the map of the serving cell CCE and the coordination cell CCE to a wireless device follows, as in block 520. The map of the serving cell CCE and the coordination cell CCE can be used to facilitate ICIC by an interference aware receiver of the wireless device.

The method can further include the node (e.g., a serving node or serving cell) transmitting the map of the serving cell CCE or the coordination cell CCE in the PRB to a coordination node (e.g., coordination cell). The serving cell CCE (or the coordination cell CCE) can be a localized CCE using a localized CCE to resource element (RE) common cell mapping pattern. The operation of transmitting the map of the serving cell CCE or coordination cell CCE in the PRB to the coordination node can use an X2 application protocol (X2AP). The serving cell ePDCCH can be a localized ePDCCH or a distributed ePDCCH. The operation of transmitting the map of the serving cell CCE and coordination cell CCE in the PRB to the wireless device can use radio resource control (RRC) signaling.

The operation of transmitting the map of the serving cell CCE or coordination cell CCE in the PRB to the coordination node can include a relative narrowband transmitter power (RNTP) per enhanced CCE (E-CCE) in ePDCCH information element (IE) with a bitmap. Each position in the bitmap can represent a E-CCE index $n_{E-CCE}$ value, for which a bit value represents RNTP $(n_{E-CCE})$, where an index is associated with a set of E-CCE, numbered from 0 to $N_{E-CCE,k}-1$, $N_{E-CCE,k}$ is a total number of E-CCE for a subframe k, and RNTP( ) is a function of the E-CCE index $n_{E-CCE}$. In another example, the operation of transmitting the map of the serving cell CCE or coordination cell CCE in the PRB to the coordination node can include an enhanced CCE (E-CCE) type information element (IE) with a bitmap. Each position in the bitmap can represent whether an E-CCE is localized or not localized.

In another example, the serving cell CCE and the coordination cell CCE can be mapped in a PRB pair. The PRB pair can be within a same subframe and can be configured to carry a plurality of ePDCCHs. The operation of transmitting the map of the serving cell CCE or coordination cell CCE in the PRB to the coordination node can include an ePDCCH PRB pair allocation information element (IE) with a bitmap. Each position in the bitmap can represent whether one PRB pair is allocated as an ePDCCH. In another example, the operation of transmitting the map of the serving cell CCE or coordination cell CCE in the PRB to the coordination node can include a number of enhanced CCE (E-CCE) in one PRB pair information element (IE) with an enumerated type. The enumerated type can represent a number of localized E-CCE in one PRB pair The method can further include the node transmitting the serving cell ePDCCH in a downlink to the wireless device, and the resource elements (REs) associated with the coordination cell ePDCCH can be blanked.

Figure 10:
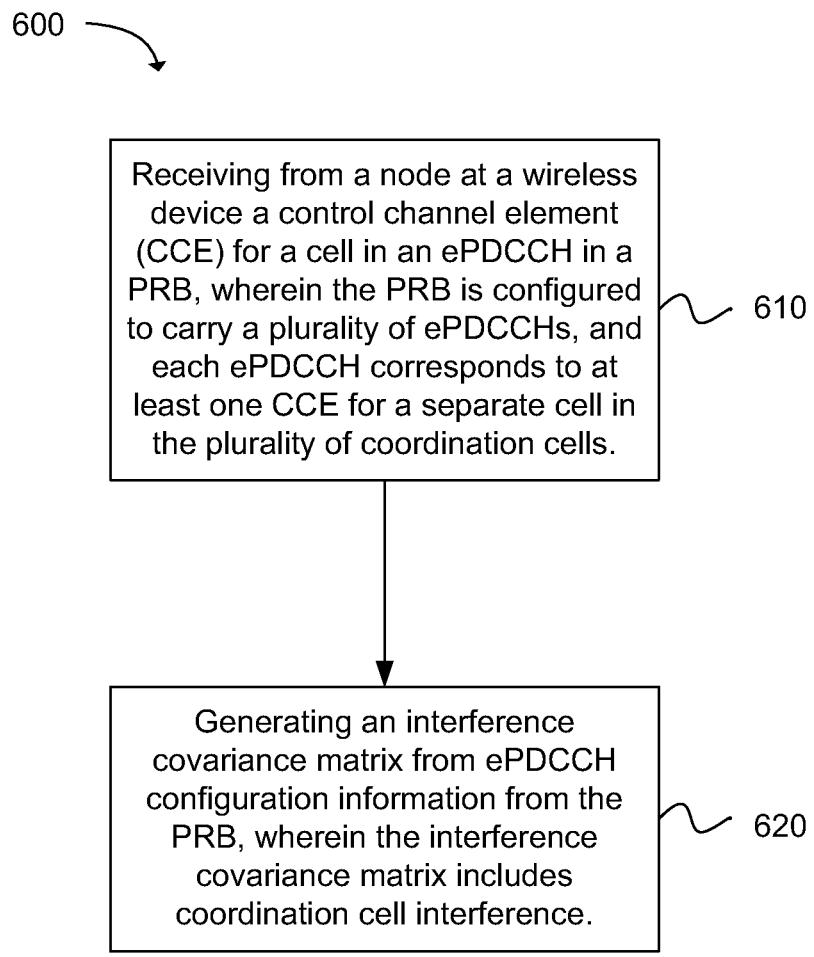
FIG. 10 depicts a flow chart of a method for using enhanced physical downlink control channels (ePDCCHs) configured for inter-cell interference coordination (ICIC) for a plurality of coordination cells in a physical resource block (PRB) at a wireless device in accordance with an example.

Another example provides a method 600 for using enhanced physical downlink control channels (ePDCCHs) configured for inter-cell interference coordination (ICIC) for a plurality of coordination cells in a physical resource block (PRB) at a wireless device, as shown in the flow chart in FIG. 10. The method may be executed as instructions on a machine, where the instructions are included on at least one computer readable medium. The method includes the operation of receiving from a node at a wireless device a control channel element (CCE) for a cell in an ePDCCH in a PRB, wherein the PRB is configured to carry a plurality of ePDCCHs, and each ePDCCH corresponds to at least one CCE for a separate cell in the plurality of coordination cells, as in block 610. The operation of generating an interference covariance matrix from ePDCCH configuration information from the PRB, wherein the interference covariance matrix includes coordination cell interference follows, as in block 620.

Resource elements (REs) associated with ePDCCH for coordination cells can be blanked. The CCE can be a localized CCE, and the ePDCCH can be a localized ePDCCH or a distributed ePDCCH. The CCE for a cell in the ePDCCH can be mapped in a PRB pair. The PRB pair can be within a same subframe and can be configured to carry a plurality of ePDCCHs.

Figure 11:
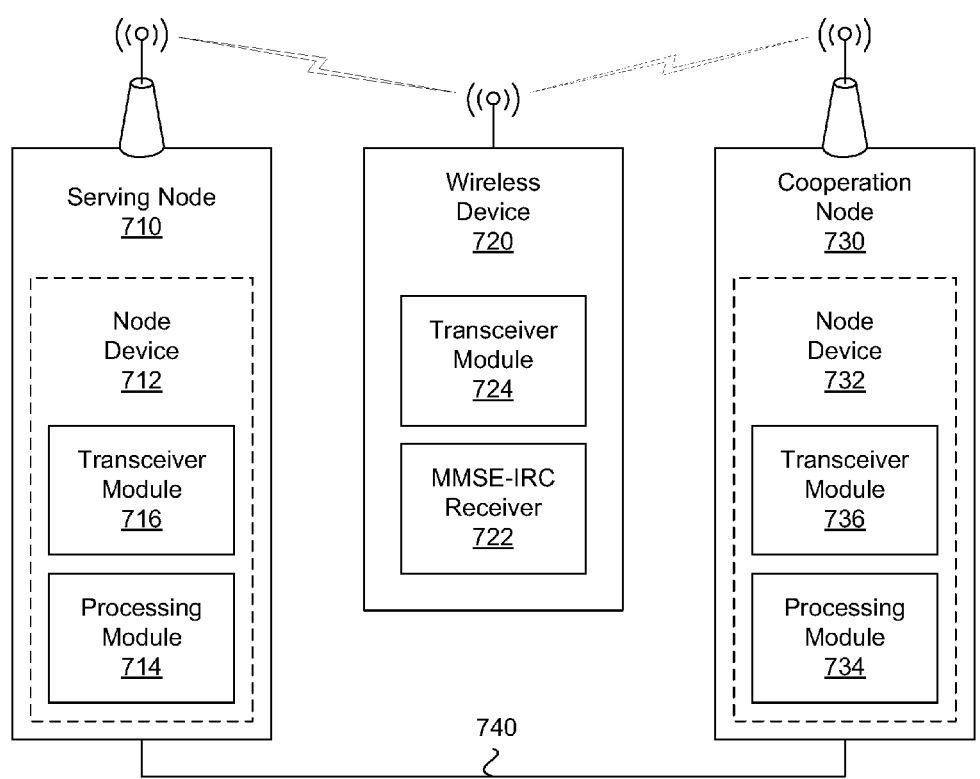
FIG. 11 illustrates a block diagram of a serving node, a coordination node, and wireless device in accordance with an example.

FIG. 11 illustrates an example node (e.g., serving node 710 and cooperation node 730) and an example wireless device 720. The node can include a node device 712 and 732. The node device or the node can be configured to communicate with the wireless device. The node device can be configured to communicate enhanced physical downlink control channels (ePDCCHs) configured for inter-cell interference coordination (ICIC) for a plurality of cells in a physical resource block (PRB). The node device or the node can be configured to communicate with other nodes via a backhaul link 740 (optical or wired link), such as an X2 application protocol (X2AP). The node device can include a processing module 714 and 734 and a transceiver module 716 and 736. The transceiver module can be configured to communicate with a wireless device and to send a map of a serving cell control channel element (CCE) associated with a serving cell ePDCCH in a PRB and a coordination cell CCE in a coordination cell ePDCCH in the PRB. The transceiver module can be further configured to communicate with a coordination node and to transmit or receive a map of the serving cell CCE or the coordination cell CCE.

The transceiver module 716 and 736 can be further configured to receive a relative narrowband transmitter power (RNTP) indication RNTP($n_{SRB}$) defined as $RNTP(n_{SRB}) =$ $$\begin{cases} 0 & \text{if } E_A(n_{SRB}) \leq RNTP_{threshold} \\ 1 & \text{if no promise about the upper limit of } \frac{E_A(n_{SRB})}{E_{max\_norm}^{(p)}} \text{ is made} \end{cases}$$

where $E_A(n_{SRB})$ is a maximum intended energy per resource element (EPRE) of user equipment-specific (UE-specific) physical downlink shared channel (PDSCH) resource elements (REs) in orthogonal frequency-division multiplexed (OFDM) symbols not containing reference signal (RS) in a sub-PRB on antenna port p in a considered future time interval, $n_{SRB}$ is a sub-physical resource block number $n_{SRB}=0, \ldots, N_{RB}^{DL} \cdot N_{SRB}-1$, $RNTP_{threshold}$ takes on one of the following values $RNTP_{threshold} \in \{-\infty,-11,-10,-9,-8,-7,-6,-5,-4,-3,-2,-1,0,+1,+2,+3\}$ in decibel [dB] and $$E_{max\_nom}^{(p)} = \frac{P_{max}^{(p)} \cdot \frac{1}{\Delta f}}{N_{RB}^{DL} \cdot N_{SC}^{RB}}$$

where $P_{max}^{(p)}$ is a node maximum output power, and $\Delta f$ is a subcarrier spacing, $N_{RB}^{DL}$ is a downlink bandwidth configuration expressed in multiples of $N_{SC}^{RB}$, $N_{SC}^{RB}$ is a resource block size in the frequency domain expressed as a number of subcarriers, and is a $N_{SRB}$ is the number of sub-physical resource blocks (SRB) in the PRB, where $N_{SRB} \in \{1,2,3,4\}$.

The transceiver module 716 and 736 can be further configured to communicate with the coordination node via an X2 application protocol (X2AP). The transceiver module further configured to communicate with the wireless device via RRC signaling. The CCEs can include localized CCEs, and the ePDCCHs can include localized ePDCCHs or distributed ePDCCHs. The transceiver module further can be configured to transmit the serving cell ePDCCH in a downlink to the wireless device. The resource elements (REs) associated with the coordination cell ePDCCH can be blanked.

The map of the serving cell CCE or the coordination cell CCE in the PRB can include a relative narrowband transmitter power (RNTP) per enhanced CCE (E-CCE) in ePDCCH information element (IE) with a bitmap. Each position in the bitmap represents a E-CCE index $n_{E-CCE}$ value, for which a bit value represents RNTP ($n_{E-CCE}$), where an index is associated with a set of E-CCE, numbered from 0 to $N_{E-CCE,k}-1$, $N_{E-CCE,k}$ is a total number of E-CCE for a subframe k, and RNTP ( ) is a function of the E-CCE index $n_{E-CCE}$. In another example, the map of the serving cell CCE or the coordination cell CCE in the PRB can include an enhanced CCE (E-CCE) type information element (IE) with a bitmap. Each position in the bitmap represents whether an E-CCE is localized or not localized.

The serving cell CCE and the coordination cell CCE can be mapped in a PRB pair. The PRB pair can be within a same subframe and can be configured to carry a plurality of ePDCCHs. The map of the serving cell CCE or the coordination cell CCE in the PRB pair can include an ePDCCH PRB pair allocation information element (IE) with a bitmap. Each position in the bitmap represents whether one PRB pair is allocated as an ePDCCH. The map of the serving cell CCE or the coordination cell CCE in the PRB pair can include a number of enhanced CCE (E-CCE) in one PRB pair information element (IE) with an enumerated type. The enumerated type can represent a number of localized E-CCE in one PRB pair.

The processing module 714 and 734 can be configured to map the serving cell CCE and the coordination cell CCE in the PRB. The node (e.g., serving node 710 and cooperation node 730) can include a base station (BS), a Node B (NB), an evolved Node B (eNB), a baseband unit (BBU), a remote radio head (RRH), a remote radio equipment (RRE), or a remote radio unit (RRU).

The wireless device 720 can include a transceiver module 724 and a minimum mean square error with interference rejection combining (MMSE-IRC) receiver 722. The wireless device can be configured to receive enhanced physical downlink control channels (ePDCCHs) configured for inter-cell interference coordination (ICIC) for a plurality of coordination cells in a physical resource block (PRB). The transceiver module can be configured to receive a control channel element (CCE) for a cell in an ePDCCH in a PRB. The PRB can be configured to carry a plurality of ePDCCHs, and each ePDCCH can be associated with at least one CCE for a separate cell in the plurality of coordination cells. In an example, the transceiver module can be configured to receive CCE for the cell in the ePDCCH in the PRB via RRC signaling.

Resource elements (REs) associated with ePDCCH for coordination cells can be blanked. The CCE for a cell in the ePDCCH can be mapped in a PRB pair. The PRB pair can be within a same subframe and can be configured to carry a plurality of ePDCCHs.

The MMSE-IRC receiver 722 can be configured to generate an interference covariance matrix from ePDCCH configuration information from the PRB (or the PRB pair). The interference covariance matrix can include coordination cell interference.

Figure 12:
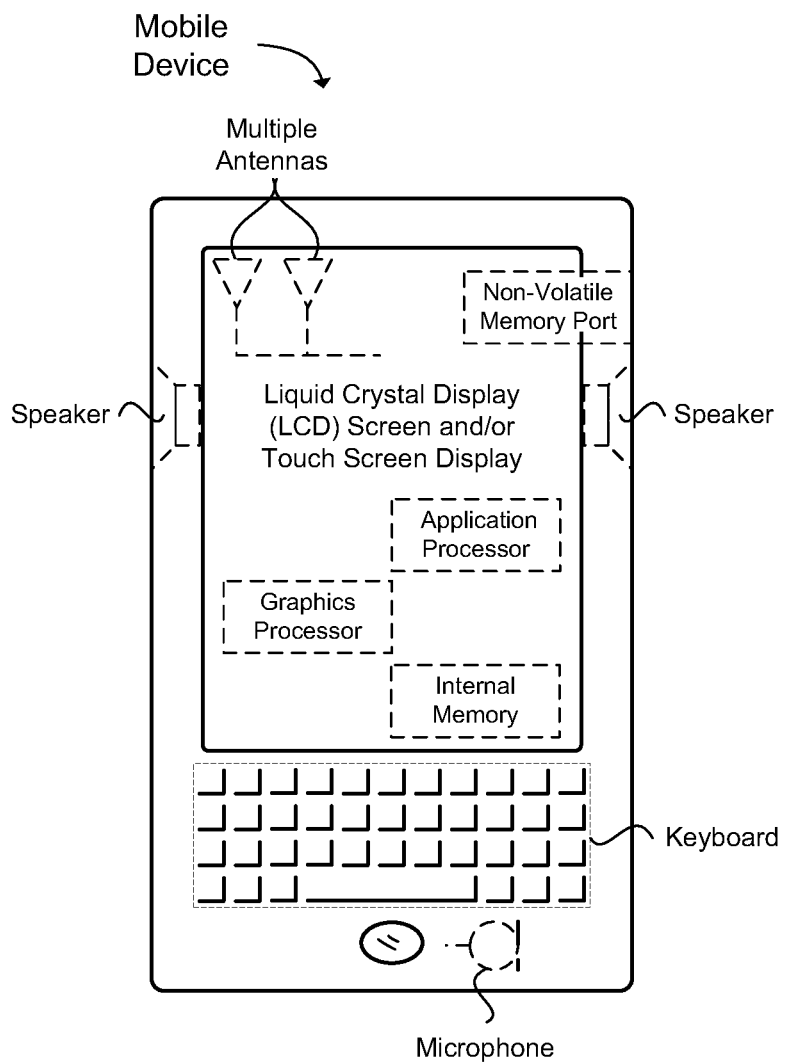
FIG. 12 illustrates a diagram of a wireless device in accordance with an example.

FIG. 12 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 12 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for communicating enhanced physical downlink control channels (ePDCCHs) configured for inter-cell interference coordination (ICIC) for a plurality of cells in a physical resource block (PRB) from a node, comprising:
   mapping a serving cell control channel element (CCE) in a serving cell ePDCCH in a PRB and a coordination cell CCE in a coordination cell ePDCCH in the PRB;
   transmitting the map of the serving cell CCE or the coordination cell CCE in the PRB to a coordination node, wherein the serving cell CCE is a localized CCE using a localized CCE to resource element (RE) common cell mapping pattern, and wherein transmitting the map of the serving cell CCE or the coordination cell CCE in the PRB to the coordination node includes a relative narrowband transmitter power (RNTP) per enhanced CCE (E-CCE) in an ePDCCH information element (IE) with a bitmap, wherein each position in the bitmap represents a E-CCE index $n_{E\text{-}CCE}$ value, for which a bit value represents RNTP ($n_{E\text{-}CCE}$), where an index is associated with a set of E-CCE, numbered from 0 to $N_{E\text{-}CCE,k}-1$, wherein $N_{E\text{-}CCE,k}$ is a total number of E-CCE for a subframe k, and RNTP ( ) is a function of the E-CCE index $n_{E\text{-}CCE}$;
   transmitting the map of the serving cell CCE and the coordination cell CCE to a wireless device for use with inter-cell interference coordination (ICIC).

2. The method of claim 1, wherein transmitting the map of the serving cell CCE or coordination cell CCE in the PRB to the coordination node uses an X2 application protocol (X2AP), and the serving cell ePDCCH is a localized ePDCCH or a distributed ePDCCH.

3. The method of claim 1, wherein the serving cell CCE and the coordination cell CCE are mapped in a PRB pair, wherein the PRB pair within a same subframe is configured to carry a plurality of ePDCCHs.

4. The method of claim 3, wherein transmitting the map of the serving cell CCE or the coordination cell CCE in the PRB pair to the coordination node includes an ePDCCH PRB pair allocation information element (IE) with a bitmap, wherein each position in the bitmap represents whether one PRB pair is allocated as an ePDCCH.

5. The method of claim 3, wherein transmitting the map of the serving cell CCE or the coordination cell CCE in the PRB pair to the coordination node includes a number of enhanced CCE (E-CCE) in one PRB pair information element (IE) with an enumerated type, wherein the enumerated type represents a number of localized E-CCE in one PRB pair.

6. The method of claim 1, wherein transmitting the map of the serving cell CCE or the coordination cell CCE in the PRB to the coordination node includes an enhanced CCE (E-CCE) type information element (IE) with a bitmap, wherein each position in the bitmap represents whether an E-CCE is localized or not localized.

7. The method of claim 1, further comprising:
   transmitting the serving cell ePDCCH in a downlink to the wireless device, wherein resource elements (REs) associated with the coordination cell ePDCCH are blanked.

8. At least one non-transitory machine readable storage medium comprising a plurality of instructions that, when executed by one or more processors, perform the following:
   mapping a serving cell control channel element (CCE) in a serving cell ePDCCH in a PRB and a coordination cell CCE in a coordination cell ePDCCH in the PRB;
   transmitting the map of the serving cell CCE or the coordination cell CCE in the PRB to a coordination node, wherein the serving cell CCE is a localized CCE using a localized CCE to resource element (RE) common cell mapping pattern, and wherein transmitting the map of the serving cell CCE or the coordination cell CCE in the PRB to the coordination node includes a relative narrowband transmitter power (RNTP) per enhanced CCE (E-CCE) in an ePDCCH information element (IE) with a bitmap, wherein each position in the bitmap represents a E-CCE index $n_{E\text{-}CCE}$ value, for which a bit value represents RNTP ($n_{E\text{-}CCE}$), where an index is associated with a set of E-CCE, numbered from 0 to $N_{E\text{-}CCE,k}-1$, wherein $N_{E\text{-}CCE,k}$ is a total number of E-CCE for a subframe k, and RNTP ( ) is a function of the E-CCE index $n_{E\text{-}CCE}$;
   sending the map of the serving cell CCE and the coordination cell CCE to a wireless device for use with inter-cell interference coordination (ICIC).

9. A node device of a node configured to communicate enhanced physical downlink control channels (ePDCCHs) configured for inter-cell interference coordination (ICIC) for a plurality of cells in a physical resource block (PRB), comprising:
   one or more antennas;
   a transceiver module configured to communicate with a wireless device and to send, via the one or more antennas, a map of a serving cell control channel element (CCE) associated with a serving cell ePDCCH in a PRB and a coordination cell CCE in a coordination cell ePDCCH in the PRB for use with inter-cell interference coordination (ICIC), wherein the map of the serving cell CCE or the coordination cell CCE in the PRB includes a relative narrowband transmitter power (RNTP) per enhanced CCE (E-CCE) in ePDCCH information element (IE) with a bitmap, wherein each position in the bitmap represents a E-CCE index $n_{E\text{-}CCE}$ value, for which a bit value represents RNTP ($n_{E\text{-}CCE}$), where an index is associated with a set of E-CCE, numbered from 0 to $N_{E\text{-}CCE,k}-1$, wherein $N_{E\text{-}CCE,k}$ is a total number of E-CCE for a subframe k, and RNTP ( ) is a function of the E-CCE index $n_{E\text{-}CCE}$.

10. The node device of claim 9, wherein transceiver module is further configured to communicate with a coordination node and to transmit or receive the map of the serving cell CCE or the coordination cell CCE.

11. The node device of claim 9, further comprising:
a processing module configured to map the serving cell CCE and the coordination cell CCE in the PRB.

12. The node device of claim 9, wherein the transceiver module is further configured to receive a relative narrowband transmitter power (RNTP) indication RNTP ($n_{SRB}$) defined as $$RNTP(n_{SRB}) = \begin{cases} 0 & \text{if } \frac{E_A(n_{SRB})}{E_{max\_norm}^{(p)}} \leq RNTP_{threshold} \\ 1 & \text{if no promise about the upper limit of } \frac{E_A(n_{SRB})}{E_{max\_norm}^{(p)}} \text{ is made} \end{cases}$$

where $E_A(n_{SRB})$ is a maximum intended energy per resource element (EPRE) of user equipment-specific (UE-specific) physical downlink shared channel (PDSCH) resource elements (REs) in orthogonal frequency-division multiplexed (OFDM) symbols not containing reference signal (RS) in a sub-PRB on antenna port p in a considered future time interval, $n_{SRB}$ is a sub-physical resource block number $n_{SRB}=0,\ldots,N_{RB}^{DL}\cdot N_{SRB}-1$, $RNTP_{threshold}$ takes on one of the following values $RNTP_{threshold} \in \{-\infty,-11,-10,-9,-8,-7,-6,-5,-4,-3,-2,-1,0,+1,+2,+3\}$ in decibel [dB] and $$E_{max\_nom}^{(p)} = \frac{P_{max}^{(p)} \cdot \frac{1}{\Delta f}}{N_{RB}^{DL} \cdot N_{SC}^{RB}}$$

where $P_{max}^{(p)}$ is a node maximum output power, and $\Delta f$ is a subcarrier spacing, $N_{RB}^{DL}$ is a downlink bandwidth configuration expressed in multiples of $N_{SC}^{RB}$, $N_{SC}^{RB}$ is a resource block size in the frequency domain expressed as a number of subcarriers, and is a $N_{SRB}$ is the number of sub-physical resource blocks (SRB) in the PRB, where $N_{SRB} \in \{1,2,3,4\}$.

13. The node device of claim 9, wherein the transceiver module further configured to communicate with the coordination node via an X2 application protocol (X2AP), the CCEs are localized CCEs, and the ePDCCHs are localized ePDCCHs or distributed ePDCCHs.

14. The node device of claim 9, wherein the transceiver module is further configured to transmit the serving cell ePDCCH in a downlink to the wireless device, wherein resource elements (REs) associated with the coordination cell ePDCCH are blanked.

15. The node device of claim 9, wherein the serving cell CCE and the coordination cell CCE is each mapped in a single PRB pair, wherein the PRB pair is located within a same subframe that is is configured to carry a plurality of ePDCCHs.

16. The node device of claim 15, wherein the map of the serving cell CCE or the coordination cell CCE in the PRB pair includes an ePDCCH PRB pair allocation information element (IE) with a bitmap, wherein each position in the bitmap represents whether one PRB pair is allocated as an ePDCCH.

17. The node device of claim 15, wherein the map of the serving cell CCE and the coordination cell CCE in the PRB pair includes a number of enhanced CCE (E-CCE) in one PRB pair information element (IE) with an enumerated type, wherein the enumerated type represents a number of localized E-CCE in one PRB pair.

18. The node device of claim 9, wherein the map of the serving cell CCE or the coordination cell CCE in the PRB includes an enhanced CCE (E-CCE) type information element (IE) with a bitmap, wherein each position in the bitmap represents whether an E-CCE is localized or not localized.

19. The node device of claim 9, wherein the node is selected from the group consisting of an a base station (BS), a Node B (NB), an evolved Node B (eNB), a baseband unit (BBU), a remote radio head (RRH), a remote radio equipment (RRE), a remote radio unit (RRU), and combinations thereof.

* * * * *